(12) United States Patent
Mills

(10) Patent No.: US 6,742,536 B2
(45) Date of Patent: Jun. 1, 2004

(54) ATTACHMENT OF FUEL VAPOR VENT VALVE TO THE INSIDE OF A FUEL TANK

(75) Inventor: Vaughn K. Mills, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 77 days.

(21) Appl. No.: 10/054,226

(22) Filed: Nov. 13, 2001

(65) Prior Publication Data

US 2003/0089405 A1 May 15, 2003

(51) Int. Cl.[7] ............................................. F16K 24/04
(52) U.S. Cl. ..................... 137/15.17; 137/202; 137/587
(58) Field of Search ............................... 137/15.17, 43, 137/202, 587; 123/509, 516

(56) References Cited

U.S. PATENT DOCUMENTS

| | | | | | |
|---|---|---|---|---|---|
| 3,548,847 A | * | 12/1970 | Roven | ......................... | 137/202 |
| 4,989,629 A | * | 2/1991 | Shirakawa | ................... | 137/202 |
| 5,277,217 A | * | 1/1994 | Kobayashi et al. | ......... | 137/202 |
| 5,954,083 A | * | 9/1999 | Hattori | ....................... | 137/202 |
| 6,062,250 A | * | 5/2000 | Takahashi | ................... | 137/202 |
| 6,499,500 B2 | * | 12/2002 | Rosseel | .................... | 137/15.17 |

FOREIGN PATENT DOCUMENTS

EP      1147934 A1  * 10/2001

* cited by examiner

*Primary Examiner*—John Rivell
(74) *Attorney, Agent, or Firm*—Roger A. Johnston

(57) ABSTRACT

A fuel vapor vent valve is formed of different plastic material than the fuel tank. A U-shaped or cupped attachment member formed of tank material is received over the valve with the upper end slotted to permit the hose fitting to extend outwardly through the slot for hose attachment within the tank. The rim of the attachment member is secured by weldment to the undersurface of the upper tank wall.

10 Claims, 3 Drawing Sheets

ATTACHMENT OF FUEL VAPOR VENT VALVE TO THE INSIDE OF A FUEL TANK

BACKGROUND OF THE INVENTION

The present invention relates to fuel vapor vent valves employed in fuel tanks filled with highly volatile fluids such as gasoline or mixtures of gasoline and alcohol and particularly relates to valves employed in motor vehicle fuel tanks.

Currently passenger cars and light truck vehicles employ fuel vapor storage devices connected to the vehicle fuel tank through a float operated valve which controls the flow of vapor in the dome above the liquid fuel level to a storage device. Currently, such valves are required to prevent the escape of liquid fuel in the event of overfilling the tank or angular displacement of the vehicle including rollover conditions.

With the advent of molded plastic fuel tanks, it has been found difficult to provide an economical design for the vent valve and the attachment of the valve to the tank. Heretofore, such vent valves had been installed through an access opening in the tank which requires sealing in a manner sufficient to prevent escape of vapor and permeation of the vapor through the material of the vent valve and the tank wall.

It has been found that the material required to withstand continuous exposure to the liquid fuel and vapor has the propensity to be permeable to the fuel vapor. This problem has been addressed by molding the tank wall of layers of different materials with a vapor impervious barrier layer embedded in the material of the tank wall.

If an access opening is formed in the top of the tank for installation of a vapor vent valve, the vapor barrier continuity is broken and the potential for localized vapor permeation has resulted.

Accordingly, it has been proposed to install the vapor vent valve on the interior of the fuel tank without forming an access opening in the upper wall of the tank.

The aforesaid proposal of mounting a vapor vent valve on the interior of the tank has been complicated by the use of high density polyethylene (HDPE) material for molding of the fuel tank. For economical installation of the vent valve on the inside of the fuel tank, the use of HDPE material for the valve has been required in order to permit securing the valve to the wall of the tank by weldment. However, HDPE material has been found not satisfactory for the structural components of the float operated valve and this has resulted in difficulties in designing and manufacturing a valve for interior installation in the tank.

BRIEF SUMMARY OF THE INVENTION

The present invention provides a unique and novel technique for installing a float operated fuel vapor vent valve inside a fuel tank and securing the valve to the tank wall by weldment. The present invention provides for a cup-shaped or U-shaped attachment member with the valve received therein and recessed below the rim of the attachment member which is secured to the inner surface of the tank wall by weldment. The attachment member secures and retains the valve in the desired position and orientation in the tank. The arrangement of the present invention thus permits the body structure of the valve to be formed of a desired material different from the material of the attachment member which is required to be the same as the tank wall material in order to facilitate attachment by weldment.

DETAILED DESCRIPTION OF THE INVENTION

Figure 1:
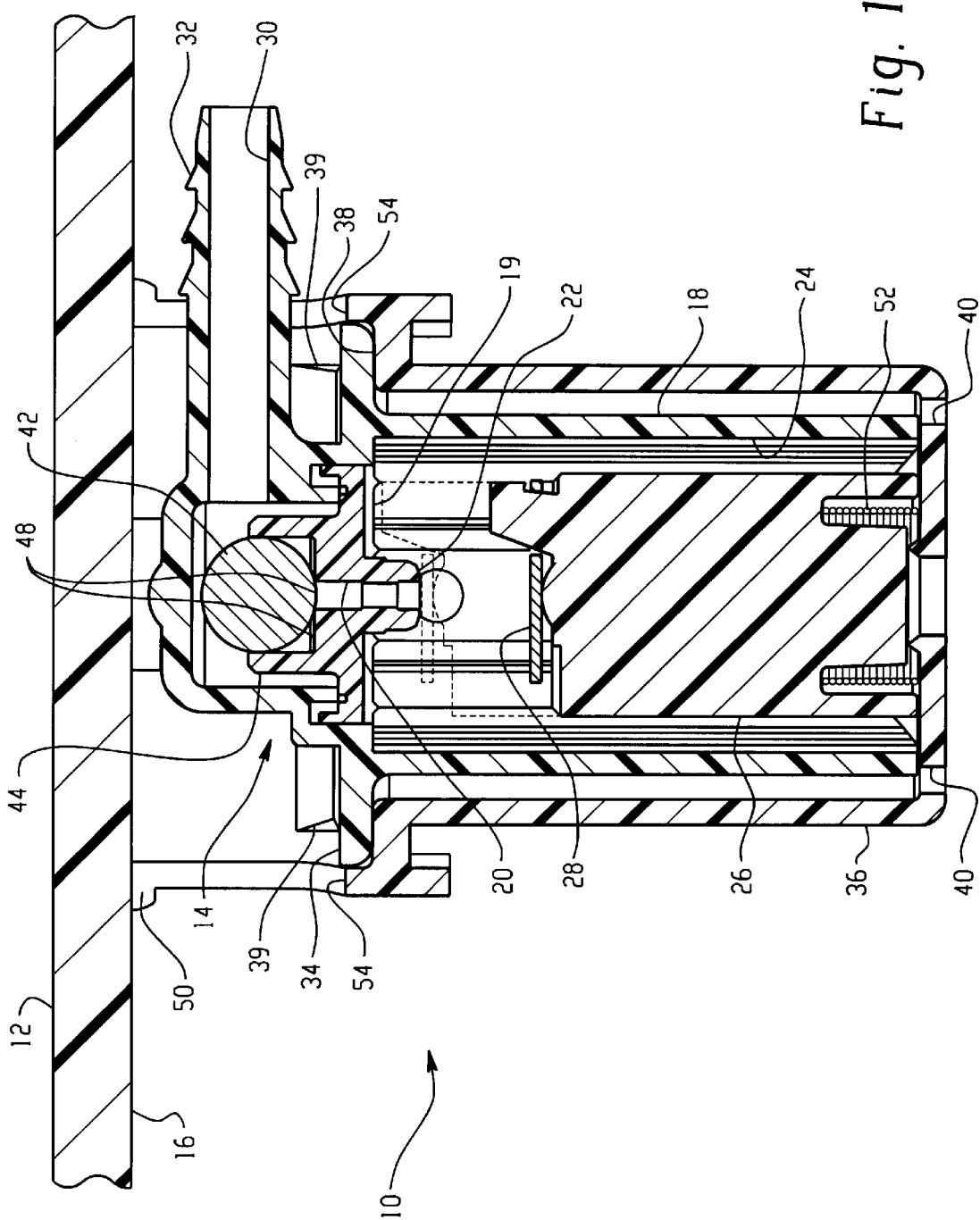
FIG. 1 is a cross-section of a first embodiment of the invention having a float operated fuel vapor vent valve secured to the upper wall of the fuel tank by weldment.

Referring to FIG. 1, the assembly of the present invention is indicated generally at 10 and includes a portion of the top wall 12 of a fuel tank with a valve assembly indicated generally at 14 disposed inside the tank and adjacent the inner surface 16 of the tank wall. The valve assembly includes a body 18 having a fuel vapor valving passage 20 formed in a seat member 19 disposed in the upper end thereof with an annular valve seat 22 disposed on the lower end of the passage 20. The body 18 has a float cavity 24 formed therein into which is slidably received a float 26 which has a flexible valving member 28 disposed on the upper end thereof. It will be understood that the float is shown in the downward most or lowered position in FIG. 1 in which the passage 20 is opened for vapor to escape therethrough to an upper vent or outlet passage 30 formed within a hose fitting 32 extending from the upper end of the valve body 18.

The valve body 18 has an annular flange 34 formed about the periphery thereof adjacent the upper end and below fitting 32.

An attaching member having a cup-shaped configuration denoted by reference numeral 36 is received over the valve body 18; and, the member 36 has an annular shoulder 38 formed thereon against which is registered the undersurface of valve body flange 34 and retained thereagainst by snapping over barbs 39.

The bottom and sides of the cup-shaped attaching member 36 are provided with liquid fuel passages 40 to permit entry of the liquid fuel into the interior of the cup-shaped member 36.

A check valve in the form of a ball or spherical member 42 is seated on the upper end of the valving passage 20 and positioned thereon by annular wall 44 formed in the valve seat member 46. The ball is preferably formed of stainless steel and maintains the vent passage closed but for small bleed grooves 48 formed in the end of the passage. When the vapor pressure in the tank reaches a predetermined level, the pressure will overcome the force of the weight of the ball, raising the ball to permit increased flow area for venting to passage 20.

It will be understood with reference to FIG. 1 that when the fuel level in the tank reaches a predetermined level near the undersurface 16 of the tank wall 12, the float is raised to a position shown in dashed outline in FIG. 1 whereby valve member 28 closes on valve seat 22 closing off the passage 20 thereby preventing liquid fuel from entering the vapor passage 30.

The upper rim 50 of the cup-shaped member 36 is attached to the undersurface 16 of the tank wall 12 by weldment which in the presently preferred practice, is accomplished by pressing the rim 50 against the surface 16 when the tank wall 12 is in the semi-molten state during formation of the top wall of the tank. Typically the tank is formed in two half shell sections with the top wall 12 being formed in one half shell which is subsequently attached to a lower half shell (not shown) after the installation of the vent valve 14 to the tank wall 12.

The construction of the embodiment of FIG. 1 thus provides a cup-shaped attachment member which shields the valve body from effects of fuel sloshing; and, the bottom of the cup-shaped member serves as a reaction surface for a float calibration spring 52 which is disposed within the cup-shaped member and calibrated to provide the desired buoyancy force on the float 26.

Preferably the upper end of the attachment member 36 has slots 54 formed therein which create castellations for the upper rim 50 of the attachment member. As shown in FIG. 1, the fitting 32 extends outwardly through one of the slots 54; and, valve 14 is recessed below the rim 50 of the attachment member.

Figure 2:
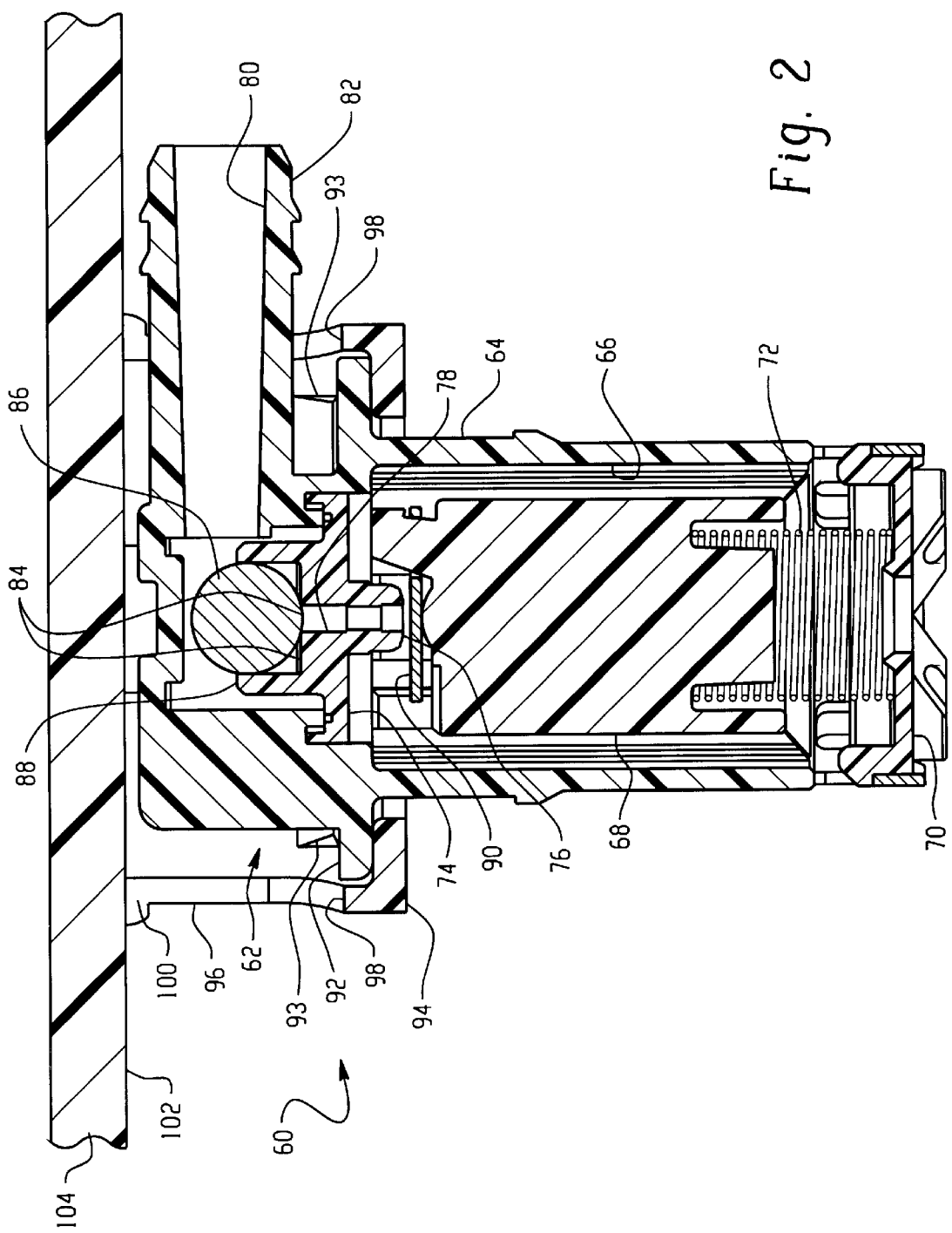
FIG. 2 is a view similar to FIG. 1 of a second embodiment of the invention; and, FIG. 3 is a view similar to FIG. 1 of another embodiment of the invention.

Referring to FIG. 2, a second embodiment of the invention is indicated generally at 60 wherein the valve assembly is indicated generally at 62 and has a valve body 64 which has a lower portion provided with the valve float cavity 66 formed therein with a float 68 slidably received therein and retained by a cap 70 provided in the bottom of the valve member 64. A buoyancy spring 72 is provided in the cavity 66, with the lower end of the spring registered against the inside surface of cap 70 and the upper end of the spring registered against the lower surface of float 68; and, the spring provides a predetermined force bias upward on the float to effect the desired buoyancy in the liquid fuel. The valve body has a valve seat member 74 disposed therein which has formed thereon a valve seat 76 which surrounds the lower end of a valving passage 78 which communicates with a vapor vent passage 80 extending outwardly from the valve body 64 through hose fitting 82.

The upper end of valving passage 78 has cross grooves 84 formed therein against which are seated a check ball 86 which is positioned by an annular wall 88 formed in the valve seat member 74.

A flexible valve member 90 is disposed on the upper surface of the float 68 and is positioned to close against the valve surface 76 upon upward movement of the float in response to rising fuel level in the tank.

The valve body 64 has an annular outwardly extending flange 92 formed thereon adjacent the upper end thereof which has the undersurface thereof registered against a corresponding inwardly extending annular flange 94 formed on the lower end of a cup-shaped attachment member 96 and retained thereagainst by snapping over barbs 93. Attachment member 96 has at least one and preferably a plurality of slots 98 formed thereabout which open to the upper rim thereof to effect a castellated configuration to the upper rim 100 of the attachment member. The hose fitting 82 extends outwardly through one of the slots 98; and, the member 92 positions and retains the valve member in position adjacent the undersurface 102 of a fuel tank upper wall 104, a portion of which is shown in FIG. 2.

In the presently preferred practice of the invention, the rim 100 of the attachment member 96 is secured to the undersurface 102 of the upper wall of the tank by weldment, preferably by forcing the rim 100 against the undersurface 102 of the tank wall in the semi-molten state during forming of the tank wall 104. Typically the tank wall is molded as part of a half section of the fuel tank which is joined to a corresponding lower half section (not shown) after installation of the attachment member 96 against surface 102.

It will be understood that the function of the valve 62 is similar to that of the embodiment of FIG. 1 wherein upon upward movement of the float 68, valve member 90 closes against valve seat 76 blocking vapor flow to passage 80. Check ball 86 limits vapor flow through passages 84 until a predetermined vapor pressure acting on the undersurface of the ball overcomes the weight of the ball and raises it from the grooves 84 to increase the vapor flow area to passage 80.

Figure 3:
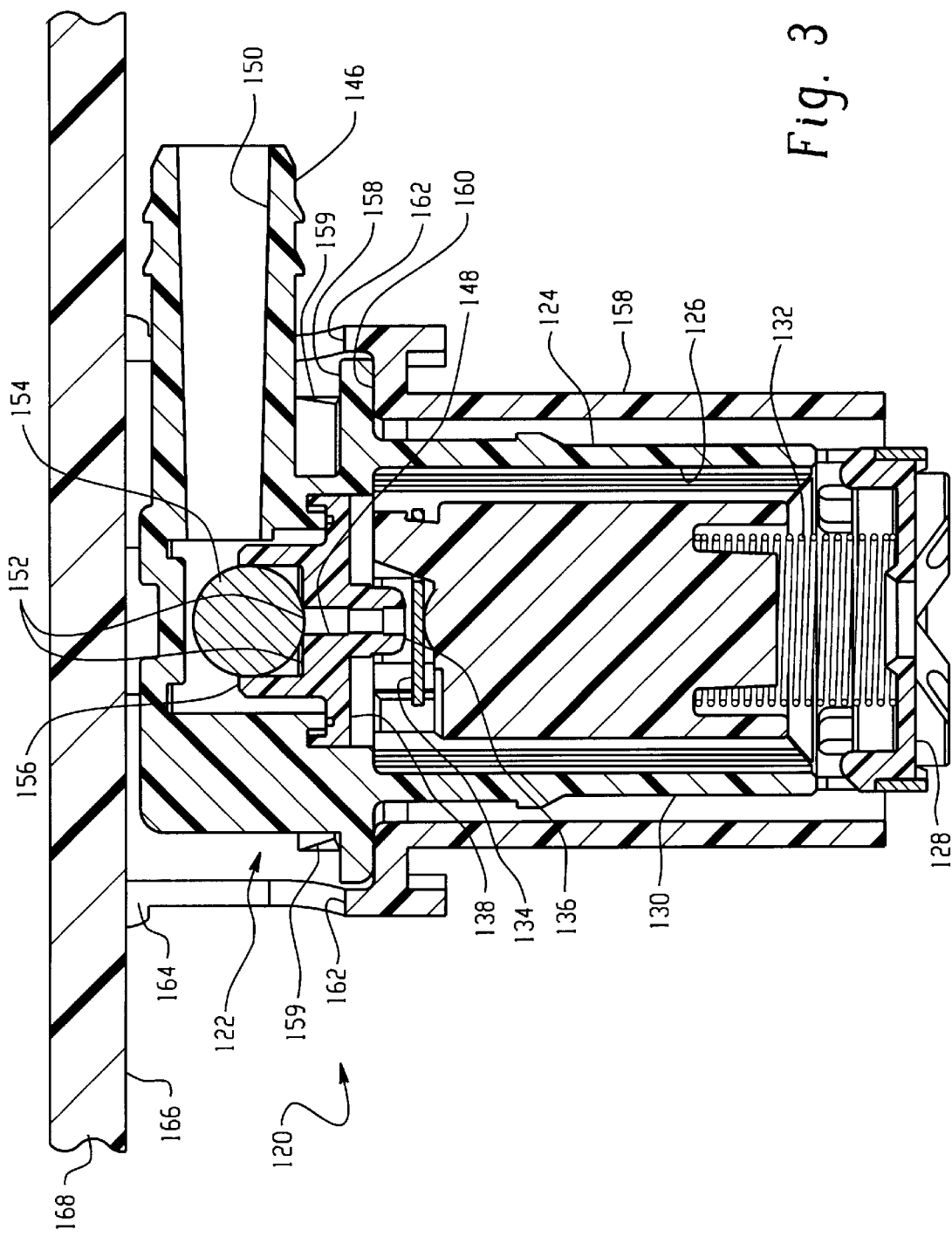

Referring to FIG. 3, another embodiment of the invention is indicated generally at 120 and includes a valve indicated generally at 122 which has a valve body 124 with a float cavity 126 formed therein in the lower end thereof which has an end cap 128 secured in the bottom end thereof retaining a float 130 slidably disposed within the cavity 126. The float is biased in an upward direction by a calibrated buoyancy spring 132 which has the lower end thereof registered against the cap 128 and the upper end registered against the lower end of the float 124.

The upper end of the float 124 has a flexible preferably elastomeric valve member 134 disposed thereon and positioned adjacent a valve seat 136 formed on the lower end of a valve seat member 138 secured to the upper end of valve body 124. A valving passage 148 is formed vertically through the valving member 138; and, passage 148 communicates with a horizontally disposed vapor vent passage 150 formed in a hose fitting 146 extending from the valve body 124. The upper end of valving passage 148 has cross grooves 152 formed therein to provide bleed flow when a check ball 154 is registered thereagainst and positioned by an annular wall 156 formed in the valving member 138.

The valve body 124 has an annular outwardly extending flange 158 formed thereon below the hose fitting 146.

A tubular attachment member 158 is received over the valve body 124; and, the attachment member 158 has an annular shoulder 160 formed thereon which extends radially inwardly and against which is registered the undersurface of the body flange 158. The flange 158 is secured in place by snapping over barbs 159 provided on the interior of attachment member 158.

The upper end of the tubular attachment member 158 has a plurality of slots 162 formed therein which slots are open to the upper rim 164 thereof and which form a castellated arrangement for the upper end of the tubular attachment member 158. The hose fitting 146 extends outwardly through one of the slots 162; and, the upper rim 164 is secured to the undersurface 166 of the upper wall of a fuel tank, a portion of which is shown at 168 in FIG. 3. In the presently preferred practice of the invention, the upper rim 164 of the member 158 is forced against the surface 166 while it is in the semi-molten state during formation of the tank wall 168 and effects a weldment. It will be understood that the tank wall 168 is typically formed as a portion of an upper half shell of the tank and is attached to a corresponding lower half shell (not shown) after weldment of the rim 164 to the undersurface 166.

It will be understood that the operation of the embodiment 120 of FIG. 3 is similar to that of the embodiment of FIG. 1 wherein upon rising fuel level in the tank the float is urged upward by the force of spring 132 and the buoyancy of the float 124 in the liquid fuel to cause valve member 134 to seat against valve seat 136 closing the valving passage 148. The check ball 154 functions similarly as in the embodiment of FIG. 1 wherein in the event of excessive vapor pressure in the tank above a predetermined threshold, the force of the vapor pressure overcomes the gravitational weight of the check ball 154 and increases the flow area of the valving passage 148 to the vent passage 150.

The present invention thus provides a unique and relatively low cost technique for attaching a float operated fuel vapor vent valve to the inner surface of the upper wall of a plastic fuel tank by weldment where the valve is formed of a different material than the tank wall.

Although the invention has hereinabove been described with respect to the illustrated embodiments, it will be understood that the invention is capable of modification and variation and is limited only by the following claims.

What is claimed is:

1. A method of mounting a fuel vapor vent valve in a fuel tank comprising:
   (a) forming a cup-shaped member and disposing a vent valve in the open end of said cup-shaped member and recessing the vent valve below the rim of the cup-shaped member and forming a subassembly thereof; and,
   (b) inserting the subassembly in the fuel tank and welding the rim of said cup-shaped member to the inside surface of the tank.

2. The method defined in claim 1, wherein said step of attaching includes attaching the rim to the undersurface of the top of the tank.

3. The method defined in claim 1, wherein said step of forming a cup-shaped member includes forming castellations about the rim thereof.

4. The method defined in claim 1, wherein said step of forming a cup-shaped member includes forming of high density polyethylene (HDPE) material.

5. In combination a vapor venting valve assembly and a vehicle fuel tank comprising:
   (a) a fuel tank having an upper wall;
   (b) a vent valve having a generally cylindrical configuration with a vent conduit connector provided thereon; and,
   (c) a housing having a cup-shaped configuration with the vent valve received within with the rim of the cup-shaped housing extending beyond said vent valve, wherein the rim of the cup-shaped housing is welded to the inside surface of the upper wall of the tank.

6. The combination defined in claim 5, wherein the rim of said cup-shaped member is castellated.

7. The combination defined in claim 5, wherein the rim of said cup-shaped member is formed of high density polyethylene (HDPE) material.

8. The combination defined in claim 5, wherein said cup-shaped member has an aperture in the closed end of the cup shape with portions of said vent valve extend downwardly therethrough.

9. The combination defined in claim 8, wherein said valve assembly is float operated and said portions extend downwardly through said aperture contain the float.

10. In combination a vapor venting valve assembly and a fuel tank comprising:
    (a) a fuel tank having an upper wall;
    (b) a float operated vent valve having a generally cylindrical configuration with a vent conduit connector provided thereon; and,
    (c) an attachment member having a generally U-shaped configuration with at least portions of the inner surface of said U-shaped member registered against the vent valve and retaining the valve against the tank, wherein the ends of said U-shaped attachment member are welded to the inner surface of the upper wall of said tank.

* * * * *